(12) United States Patent
Park et al.

(10) Patent No.: US 8,803,819 B2
(45) Date of Patent: Aug. 12, 2014

(54) APPARATUS AND METHOD FOR INPUTTING CHARACTERS IN A TERMINAL

(75) Inventors: Se-Hwan Park, Suwon-si (KR); Ji-Youn Jeon, Seoul (KR)

(73) Assignee: Samsung Electronics Co., Ltd (KR)

( * ) Notice: Subject to any disclaimer, the term of this patent is extended or adjusted under 35 U.S.C. 154(b) by 459 days.

(21) Appl. No.: 12/905,546

(22) Filed: Oct. 15, 2010

(65) Prior Publication Data

US 2011/0090164 A1   Apr. 21, 2011

(30) Foreign Application Priority Data

Oct. 20, 2009   (KR) .................. 10-2009-0099757

(51) Int. Cl.
*G06F 3/041* (2006.01)
(52) U.S. Cl.
USPC .......................................... 345/173; 345/156
(58) Field of Classification Search
USPC ......................................... 345/156, 173–179
See application file for complete search history.

(56) References Cited

U.S. PATENT DOCUMENTS

| | | | |
|---|---|---|---|
| 6,731,227 B2 * | 5/2004 | Horie | 341/22 |
| 2004/0263479 A1 | 12/2004 | Shkolnikov | |
| 2007/0180718 A1 | 8/2007 | Fourquin et al. | |
| 2010/0127994 A1 | 5/2010 | Aono et al. | |
| 2010/0146460 A1 * | 6/2010 | Dunko | 715/863 |
| 2010/0156798 A1 * | 6/2010 | Archer | 345/169 |

FOREIGN PATENT DOCUMENTS

| | | |
|---|---|---|
| CN | 101001433 | 7/2007 |
| CN | 101040316 | 9/2007 |
| CN | 101523332 | 9/2009 |

\* cited by examiner

*Primary Examiner* — Kevin M Nguyen
*Assistant Examiner* — Cory Almeida
(74) *Attorney, Agent, or Firm* — The Farrell Law Firm, P.C.

(57) ABSTRACT

A method and apparatus for easily selecting a character in a terminal including a touch screen, wherein a touch keypad is divided into a central layout including keys, and a sub layout including extended keys. According to an inclined angle and an inclined direction of a terminal, the sub layout opposite to the inclined direction based on the central layout is combined with the central layout, displaying a combined keypad including the central layout and the sub layout, on the display.

16 Claims, 5 Drawing Sheets

INCLINATION 10°    INCLINATION 20°    INCLINATION 30°

APPARATUS AND METHOD FOR INPUTTING CHARACTERS IN A TERMINAL

PRIORITY

This application claims priority under 35 U.S.C. §119(a) to a Korean Patent Application filed in the Korean Industrial Property Office on Oct. 20, 2009 and assigned Serial No. 10-2009-0099757, the content of which is incorporated herein by reference.

BACKGROUND OF THE INVENTION

1. Field of the Invention

The present invention generally relates to a method for inputting a character in a terminal, and more particularly to an apparatus and method for inputting a character, by which it is possible to easily input a character in a touch screen-equipped terminal.

2. Description of the Related Art

In order to overcome the problem of carrying of a general keyboard and a mouse, an input window in a keyboard shape is usually displayed on a touch screen so as to receive an input through a pen click or touch. Examples of devices including this type of interface include an electronic scheduler, a cellular phone, a Personal Digital Assistant (PDA), or the like.

A touch screen provides an interface in which a user touches an icon, a touch keypad, etc. displayed on a screen using a finger, a stylus, or the like so the user can input a command or a character in a terminal. As the terminals have been reduced in size and weight, similar reductions in the touch screen cannot be avoided.

FIG. 1 illustrates a conventional touch keypad displayed on a screen and designed for miniature displays.

Referring to FIG. 1, the touch screen of the terminal is divided into a character input window 10 for displaying an input character and a touch keypad 20 for receiving a touch input from a user. The touch keypad 20 generally employs the keyboard arrangement scheme common to a personal computer. However, when all of the keys of the keyboard are desired to be displayed, an area to which each key button may be allocated is relatively small due to the limited size of the touch screen.

As described above, when the user inputs a character using a finger through the conventional touch screen, the user presses a small button on the keyboard that is displayed in the miniaturized touch screen. Accordingly, the minimum key size should be approximately the size of a fingertip.

Further, a method for quickly and easily inputting a character while decreasing the number of characters displayed on a current screen has been demanded. However, there is tension between offering a large number of characters and displaying them at a size large enough to be easily accessed. Therefore, a method for improving a problem in the touch input while overcoming the size limitation of the touch screen has been demanded. Further, according to the increased interest in the design of various user interfaces, it is necessary to satisfy the demand for a novel user interface in an aesthetic, easy-to-use manner.

SUMMARY OF THE INVENTION

Accordingly, the present invention has been designed to solve at least the above-described problems occurring in the prior art, and to provide at least the following advantages. The present invention provides an apparatus and method for inputting a character, in which a user can easily select a desired icon or character, while overcoming the size limitation of a conventional touch screen.

Further, the present invention provides an apparatus and method for inputting a character, in which a three-dimensional projection onto a touch keypad is adaptively changed in a terminal according to an inclination of the terminal by a user.

In accordance with an aspect of the present invention, there is provided an apparatus for inputting a character in a terminal. The apparatus includes a sensor unit for detecting an inclined angle and an inclined direction of the terminal; a display unit for displaying a keypad in a key input mode, the keypad including a central layout in which multiple basic keys are arranged; a touch input unit for transferring an input data according to a touch input by a user within the keypad including the central layout; and a control unit for combining a sub layout opposite to the detected inclined direction in which extended keys are arranged with the central layout, and displaying the combined keypad including a combined layout of the central layout and the sub layout, on the display unit.

In accordance with another aspect of the present invention, there is provided a method for inputting a character in a terminal. The method including displaying a keypad in a key input mode, the key pad including a central layout in which multiple basic keys are arranged; detecting an inclined angle and an inclined direction of the terminal; combining a sub layout opposite to the detected inclined direction, in which extended keys are arranged, with the central layout; and displaying the keypad including a combined layout of the central layout and the sub layout.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Hereinafter, various embodiments of the present invention will be described with reference to the accompanying drawings. Further, in the following description of the present invention, a detailed description of known functions and configurations incorporated herein will be omitted where it may make the subject matter of the present invention unclear.

In accordance with an embodiment of the present invention, a method is provided for easily selecting a character by a user in a terminal including a touch screen, wherein a single touch keypad is divided into a central layout, in which basic keys are arranged, and one or more sub layouts, in which extended keys are arranged.

Further, after the central layout is displayed, a sub layout opposite to an inclined direction with respect to the central layout is combined with the central layout according to an inclination and inclined direction of the terminal, to display a combined layout. As described above, the sub layout is displayed together with the central layout according to the inclination of the terminal, so that it is possible to easily input a desired icon or character while overcoming the size limitation of the touch screen.

In accordance with an embodiment of the present invention, the terminal includes a geomagnetic sensor that measures an inclination and an inclined direction of the terminal, and a three-dimensional (3D) engine for more vividly implementing a Graphic User Interface (GUI) that responds to the measured inclined angle and direction.

Figure 1:
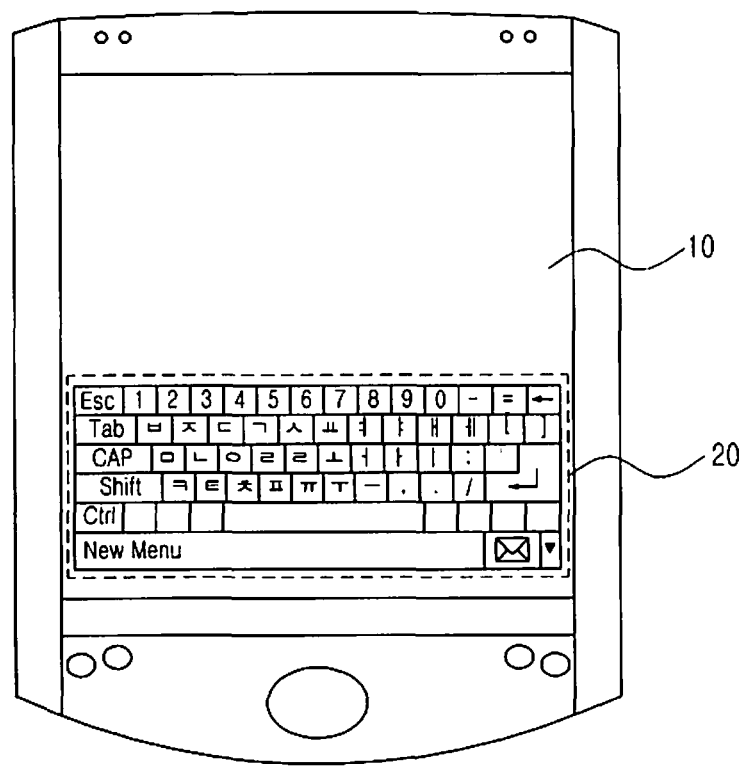
FIG. 1 is a diagram illustrating a conventional touch keypad in a portable device.
Figure 2:
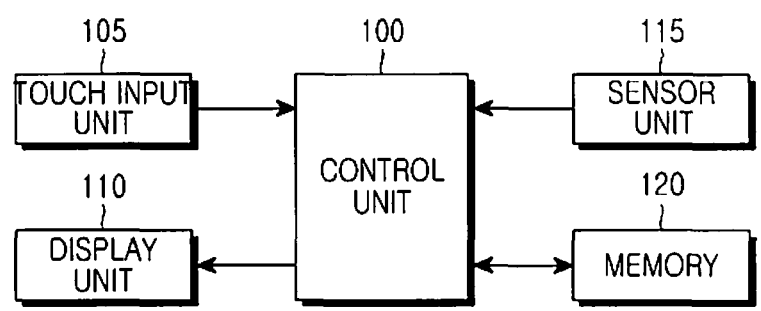
FIG. 2 is a diagram illustrating an internal construction of a terminal according to an embodiment of the present invention.

FIG. 2 is a diagram illustrating an internal construction of a terminal according to an embodiment of the present invention.

Referring to FIG. 2, the terminal includes a control unit 100, a touch input unit 105, a display unit 110, a sensor unit 115, and memory 120. The display unit 110 may be a display device, such as a Liquid Crystal Display (LCD).

When a user touches the touch input unit 105, the touch input unit 105 transfers an input data corresponding to the touch input to the control unit 100.

In accordance with an embodiment of the present invention, when an inclination of a mobile terminal is detected, in addition to the central layout in which basic keys are arranged, the display unit 110 also displays the sub layout in which extended keys are arranged, according to the inclined direction and angle. The touch input unit 105 is mounted on the display unit 110 to form the touch screen, so that the user can select or input a character, an icon, etc. through a touch keypad, etc. Therefore, when the touch input of the user is generated within the keypad, e.g., the keypad including the central layout or the layout including the combination of the central layout with the sub layout, displayed on the display unit 110, the touch input unit 105 transfers the input data according to the touch input to the control unit 100.

The sensor unit 115, such as a geomagnetic sensor, detects an inclined angle and an inclined direction of the terminal. The sensor unit 115 uses angular momentum in detecting angular movement, based on an inertia space around at least one axis orthogonal to a spin axis. The sensor unit 115 detects an inclination of one direction among upper, lower, left, and right directions from a state in which the display unit 110 uprightly faces the user. Here, based on the display unit 110, the sensor unit 115 determines the upright state of the terminal. Therefore, the sensor unit 115 detects an inclination from the upright state of the terminal based on the display unit 110, and then outputs a signal according to the inclined direction and angle to the control unit 100.

The memory 120 includes a Read Only Memory (ROM), a Random Access Memory (RAM), etc., for storing a plurality of programs and data. The memory 120 stores the 3D engine for expressing a 3D effect when the central layout and the sub layout are displayed together in the touch keypad.

The control unit 100 controls the general operation of the terminal, and forms the keypad layout to be displayed on the display unit 110 according to the inclined angle and direction of the terminal. When the display unit 110 is in the upright state, the layout displays only the central layout in which the basic keys are arranged. When the terminal is moved into an inclined, the control unit 100 combines the sub layout in which the extended keys are arranged with the central layout, according to the inclined direction, to form a combined layout. Therefore, when the terminal is in the upright state, the user can input the basic keys arranged in the central layout, and when the user inclines the terminal, other keys arranged in the sub layout opposite to the inclined direction are displayed. Further, according to the increase of the inclined angle detected by the sensor unit 115, the control unit 100 decreases a size of the central layout and relatively increases a size of the sub layout combined with the central layout, so that it changes a size ratio and displays the combined layout.

Figure 3:
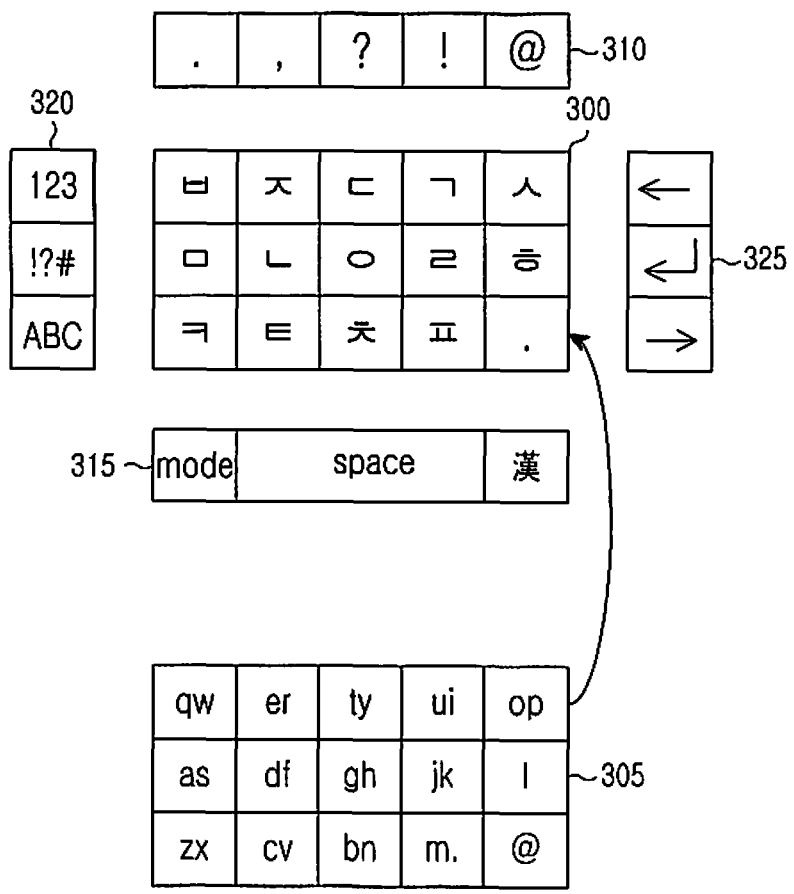
FIG. 3 is a diagram illustrating key arrangement layouts according to an embodiment of the present invention.
Figure 4:
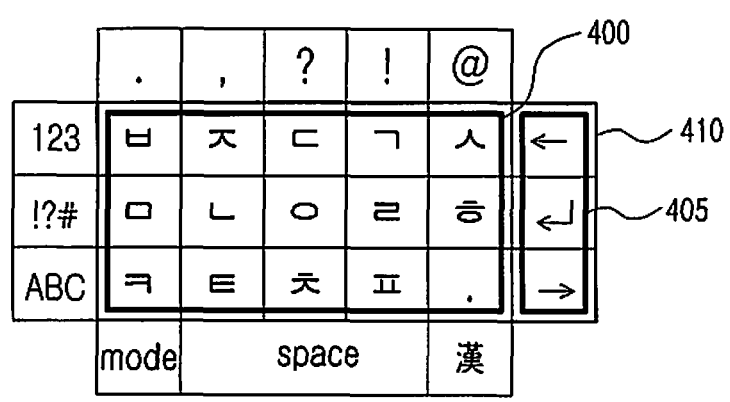
FIG. 4 is a diagram illustrating a combination of a central layout and a sub layout according to an embodiment of the present invention.

FIG. 3 is a diagram illustrating a key arrangement in layouts according to an embodiment of the present invention, and FIG. 4 is a diagram illustrating a combination of the central layout and the sub layout according to an embodiment of the present invention.

In order to express the 3D effect on the layouts, the keys are classified according to function, and the basic keys for inputting principal characters are arranged in the central layout. One or more sub layouts can be arranged in a left, right, upper and/or lower sides around the central layout.

For example, a plurality of keys included in an existing QWERTY-type keyboard can be classified as illustrated in FIG. 3. For example, the keys can be grouped according to their characteristics and frequency of use.

Referring to FIG. 3, the classified keys are arranged in the central layouts 300 and 305, and the sub layouts 310, 315, 320, and 325, respectively. The touch keypad is generally divided into the central layouts 300 and 305, in which the character keys including Korean letters, and English letters, are arranged, and the sub layouts 310, 315, 320, and 325, which include the sub layout 310, in which punctuation keys are arranged, the sub layout 315 in which mode shift keys such as a Korean/English key and a space key, are arranged, the sub layout 320 in which mode shift keys including number keys, English character keys, and symbol keys, are arranged, and the sub layout 325 in which keys for editing a character such as a backspace key, and an enter key, are arranged.

In a Korean character input mode, the central layout 300 displays the Korean characters. When the Korean character input mode is shifted to an English character input mode, the central layout 300 is changed to the central layout 305, which displays the English characters.

An example of a combination of the central layout and the sub layouts is illustrated in FIG. 4.

Referring to FIG. 4, each of the layouts is formed in three dimensions based on the central layout 400, and the four sub layouts are combined with an upper, lower, left, and right side of the central layout. When the terminal is positioned in an upright state, only the central layout 400 is displayed. When the user inclines the terminal to the left, a right sub layout 405 is combined with the central layout 400 to form a combined layout 410. When this occurs, the central layout 400 and the right sub layout 405 are displayed together on the display unit 110. Therefore, it is possible to view the keys arranged in the sub layout 405, as well as the keys arranged in the central layout 400, expanding a range for a key selection.

Each of the layouts can be formed in three dimensions as described in the following. In particular, displaying of a polyhedron or a hexahedron including a single central layout and one or more sub layouts around the central layout, such as an upper layout, a lower layout, a left layout, or a right layout, may be implemented through displaying a three-dimensional layout showing one face of the shape (i.e., the central layout) together with another face of the shape (i.e. a sub layout).

Further, when the central layout and the sub layout are displayed in a three-dimensional polyhydric layout, a size ratio of the central layout to the sub layout can be changed according to an inclined angle of the terminal, altering the shape of the layout. For example, if the user inclines the terminal to view the sub layout the size of the central layout decreases, and simultaneously the size of the sub layout increases according to the inclined angle of the terminal.

In this case, the user can easily use the keys arranged in the enlarged layout. As such, the user can view the sub layout, according to the inclination of the terminal, so that the user can touch the keys arranged in the sub layout. Therefore, the present invention can overcome the size limitation of the touch screen for the character input. Further, the combined layout is displayed in three dimensions when the central layout is displayed together with the sub layout, so that the user can feel as if the character is being input in the three-dimensional space.

Figure 5:
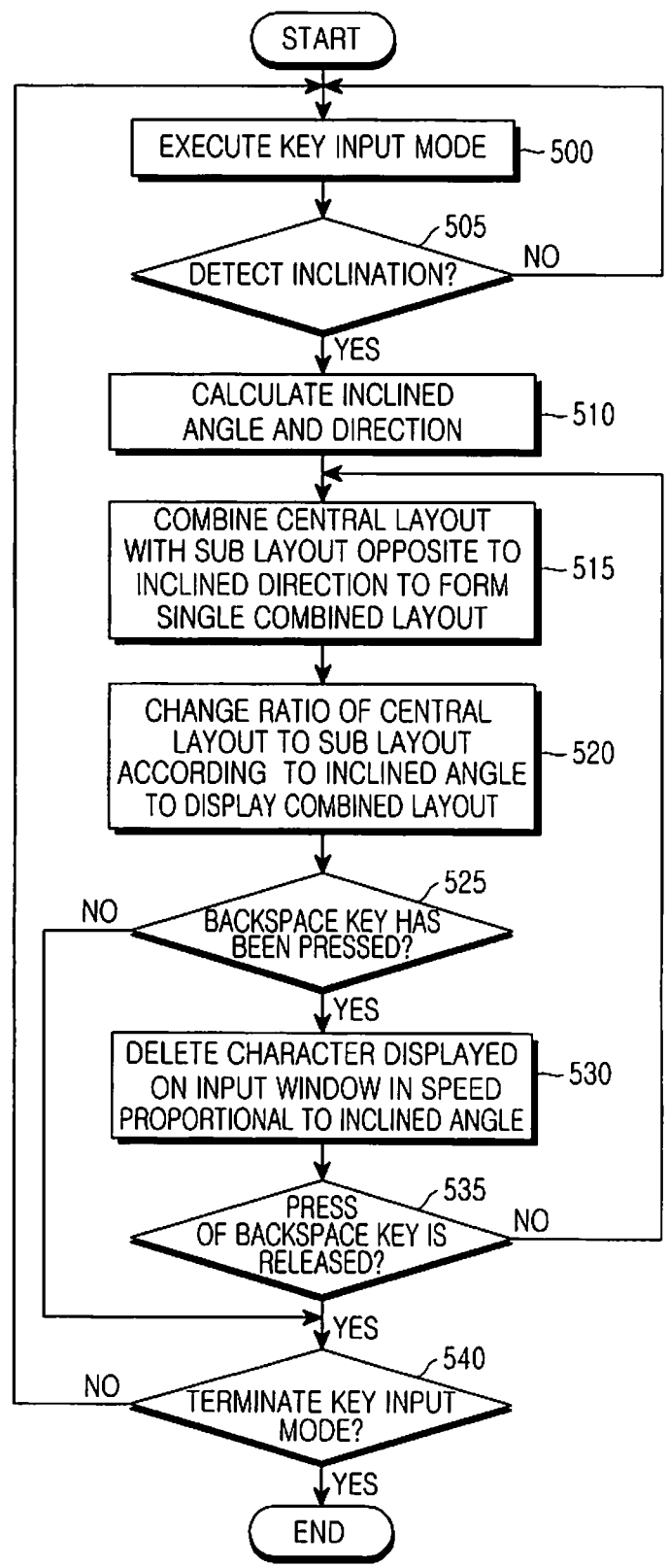
FIG. 5 is a flowchart illustrating a process of inputting a character in a terminal according to an embodiment of the present invention.

FIG. 5 is a flowchart illustrating a process of inputting a character in a terminal according to an embodiment of the present invention. Additionally, the following description of the method will make reference to the display layouts illustrated in FIGS. 6A to 6C, but is not limited thereto.

In step 500, the user selects a key input mode to input a character. In the key input mode, the user inputs a character through the touch input unit 105, and the terminal displays the corresponding character and performs an action, such as waiting for another key input. In key input mode, the terminal detects an inclination of the terminal based on a signal provided from the sensor unit 115 in step 505. If the terminal detects an inclination, it calculates an inclined angle and inclined direction in step 510. Here, the terminal calculates the inclined angle and direction based on the upright state of the display unit 110 in front of the user.

In step 515, the terminal combines a sub layout opposite to the inclined direction to a central layout, to form a combined single layout. In step 520, the terminal changes a ratio of the central layout to the sub layout according to the inclined angle and displays the combined layout.

Figures 6A, 6B, 6C:
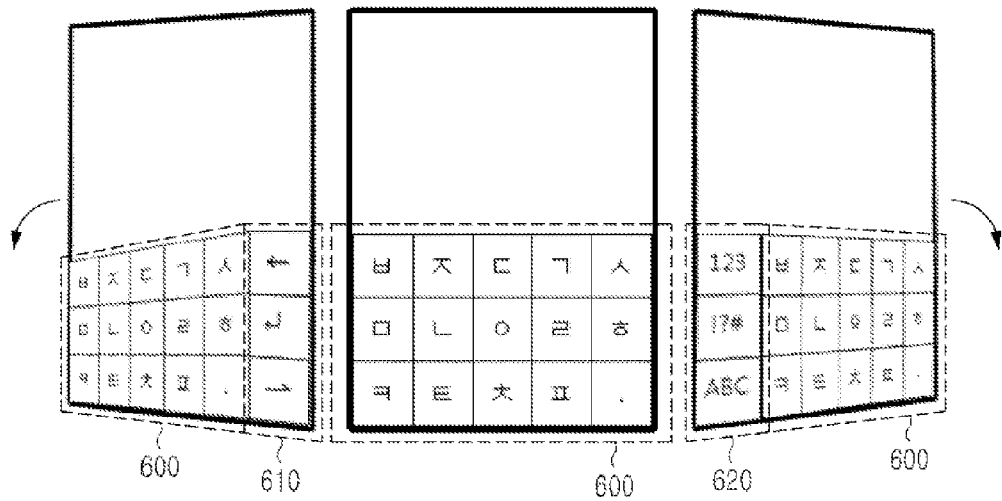
FIGS. 6A to 6C are diagrams illustrating a character input screen that is changed according to an inclination of a terminal according to an embodiment of the present invention.

As illustrated in FIG. 6B, when the terminal is in the upright state, only the central layout 600, in which, for example, the Korean characters are arranged, is displayed. When the user inclines the terminal to the left, as illustrated in FIG. 6A, a right sub layout 610 opposite to a left side of the central layout 600 is combined with the central layout 600, displaying a combined layout. Further, as illustrated in FIG. 6C, when the user inclines the terminal to the right, a left sub layout 620 is combined with the central layout 600, displaying a combined layout. The combined layouts are formed by three-dimensionally combining the central layout, which corresponds to one surface of a polyhedron, with the sub layout, which corresponds to another surface opposite to the detected inclined direction among other surfaces of the polyhedron.

Further, when the terminal is inclined, the central layout 600 is displayed together with the sub layout 610 or 620 opposite to the inclined direction, and especially, the ratio of the central layout 600 to the sub layout 610 or 620 is changed according to the inclined angle. Therefore, the user can input the keys arranged in the central layout 600, as well as keys arranged in the sub layout 610 or 620, at the same time. Accordingly, the present invention has an advantage in that the user can easily input other keys as occasion demands, as well as the characters using the basic keys of the Korean or English characters at the same time.

If the inclined angle is greater than or equal to a predetermined threshold, the display scheme is implemented so as to combine the corresponding sub layout with the central layout. Otherwise, when the inclination is detected, the display scheme may be implemented so as to combine the sub layout with the central layout and then to gradually display the sub layout little by little according to the inclined angle.

Further, the display scheme may be implemented so as to display the sub layout while gradually increasing a size of each of the keys arranged in the sub layout that comes to be viewed according to the inclined angle. As such, the display scheme of the sub layout combined with the central layout is not limited thereto, and it is apparent that many other display schemes can be applied to the present invention.

As described above, when the user inclines the terminal, as illustrated in FIG. 6A, the sub layout 610 or 620 opposite to the inclined direction is gradually displayed from a state in which the central layout 600 including the arrangement of the basic keys has been displayed. Through the touch keypad formed in the above scheme, the user can select and input the character and delete the character input through pressing a backspace key shown in FIG. 6A that is used for the character deletion.

An embodiment of the present invention further proposes a method for proportionally controlling a deletion speed according to the inclined angle. To this end, the terminal determines if the user has pressed the backspace key in step 525. When the backspace key is pressed, the terminal deletes the character displayed on the input window in a speed proportional to the inclined angle in step 530. The terminal determines if the backspace key is released in step 535. As long as the backspace key is not released, the terminal deletes the displayed characters. When the backspace key is released, the terminal returns to step 500 if the key input mode is not terminated in step 540.

Figures 7A, 7B, 7C:
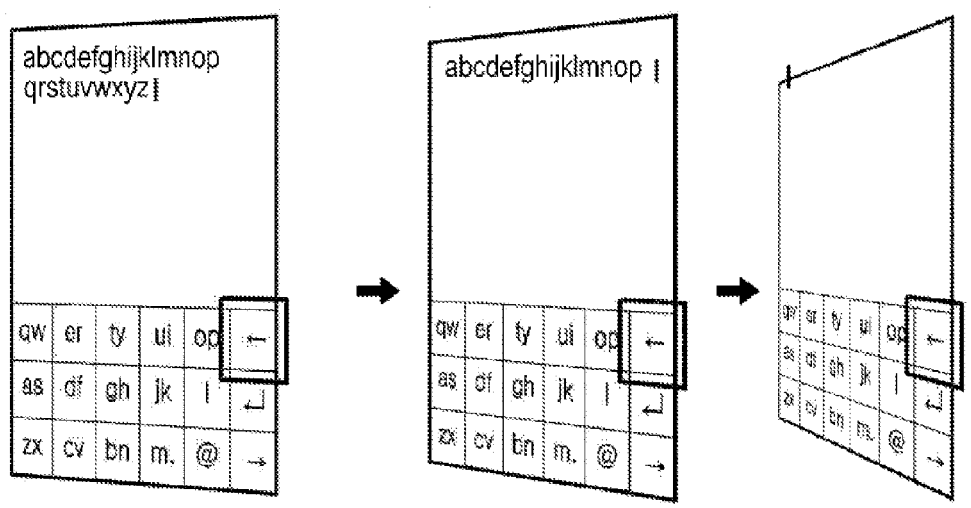
FIGS. 7A to 7C are diagrams illustrating a process of deleting a character, which is proportionally changed according to an inclination of a terminal, according to an embodiment of the present invention.

For example, as illustrated in FIGS. 7A to 7C, when the user inclines the terminal to the left, the right sub layout, in which the keys for editing characters are arranged, is combined with the central layout so that the single combined layout is displayed. At this time, when the user changes the inclined angle while pressing the backspace key, the speed for deleting the characters is proportionally increased/decreased according to the inclined angle.

In FIG. 7A, many characters are displayed on the character input window, and when the inclined angle is 10°, the character displayed on the character input window is deleted in a speed corresponding to the inclined angle. As the inclined angle increases, the character deletion speed increases. Therefore, when the user wants to delete many characters, the user can conveniently use the deletion function and incline the terminal more.

As described above, the present invention proposes a method for displaying a touch keypad that varies according to an inclined angle and inclined direction of the terminal, so that it is possible to overcome the size limitation of the touch screen and easily input or delete the desired icon or character.

According to the present invention, when the user inputs the character, it is possible to provide the user with a speedy access scheme for inputting characters in a three-dimensional space.

Further, the present invention renders the touch keypad including multiple layouts and displays a desired layout according to the inclination of the terminal, so that the user can touch the character arranged on the desired layout, thereby advantageously overcoming the size limitation of the touch screen.

Further, when the present invention uses the variable layout, it is possible to arrange the key buttons having various additional functions, so that the present invention can advantageously create a novel service that is improved from the conventional character input.

While the present invention has been shown and described with reference to certain embodiments and drawings thereof, it will be understood by those skilled in the art that various changes in form and detail may be made therein without departing from the spirit and scope of the invention as defined by the appended claims.

What is claimed is:

1. An apparatus for inputting a character in a terminal, comprising:
    a sensor unit for detecting an inclined angle and an inclined direction of the terminal;
    a display unit for displaying a keypad in a key input mode, the keypad including a central layout in which a plurality of keys are arranged;
    a touch input unit for transferring input data according to a touch input by a user within the keypad; and
    a control unit for combining a sub layout opposite to a detected inclined direction, in which extended keys are arranged, with the central layout, and displaying the plurality of keys arranged in the central layout with the extended keys arranged in the sub layout on the display unit.

2. The apparatus as claimed in claim 1, wherein the control unit changes a size ratio of the central layout to the sub layout according to a degree of the inclined angle detected by the sensor unit.

3. The apparatus as claimed in claim 2, wherein the control unit decreases a size of the central layout and relatively increases a size of the sub layout according to an increase in the degree of the inclined angle detected by the sensor, to change the size ratio of the central layout to the sub layout.

4. The apparatus as claimed in claim 1, wherein when the input data corresponding to the touch input from the user from the keypad is transferred to the touch input unit, the control unit outputs a character corresponding to the input data through a character input window on the display unit.

5. The apparatus as claimed in claim 1, wherein the control unit determines if a backspace key has been pressed on the touch input unit, and when the inclination of the terminal is detected by the sensor unit and the backspace key has been pressed, the control unit adjusts a character deletion speed in proportion to the inclined angle.

6. The apparatus as claimed in claim 1, wherein the sub layout opposite to the inclined direction is one of upper, lower, left, and right sub layouts around the central layout.

7. The apparatus as claimed in claim 1, wherein the central layout includes character keys for inputting at least one of Korean characters and English characters, and wherein the sub layout includes at least one of an edit key, a mode shift key, and a punctuation key.

8. The apparatus as claimed in claim 1, wherein the central layout corresponds to a surface of a polyhedron and the sub layout corresponds to another surface opposite to the detected inclined direction among other surfaces of the polyhedron.

9. A method for inputting a character in a terminal, the method comprising the steps of:
    displaying a keypad in a key input mode, the keypad including a central layout in which a plurality of keys are arranged;
    detecting an inclined angle and an inclined direction of the terminal;
    combining a sub layout opposite to a detected inclined direction, in which extended keys are arranged, with the central layout; and
    displaying the plurality of keys arranged in the central layout with the extended keys arranged in the sub layout.

10. The method as claimed in claim 9, wherein displaying the keypad including the combined layout comprises changing a size ratio of the central layout to the sub layout according to the detected inclined angle.

11. The method as claimed in claim 10, wherein changing the size ratio comprises decreasing a size of the central layout and relatively increasing a size of the sub layout, according to increase of the detected inclined angle.

12. The method as claimed in claim 9, further comprising outputting an input data according to a touch input, when the touch input is generated by a user.

13. The method as claimed in claim 12, further comprising:
    determining if a backspace key has been pressed,
    determining if the terminal is inclined while the backspace key is pressed; and
    adjusting a character deletion speed in proportion to the inclined angle.

14. The method as claimed in claim 9, wherein the sub layout opposite to the inclined direction is one of upper, lower, left, and right sub layouts around the central layout.

15. The method as claimed in claim 9, wherein the central layout includes character keys for inputting one of Korean characters and English characters, and the sub layout includes at least one of an edit key, a mode shift key, and a punctuation key.

16. The method as claimed in claim 9, wherein the combined layout is formed by three-dimensionally combining the central layout corresponding to a surface of a polyhedron with the sub layout corresponding to another surface that is opposite to the detected inclined direction from among other surfaces of the polyhedron.

* * * * *